A. GERSTNER.
NON-SKID DEVICE FOR AUTOMOBILES.
APPLICATION FILED JULY 20, 1917.
1,256,221. Patented Feb. 12, 1918.
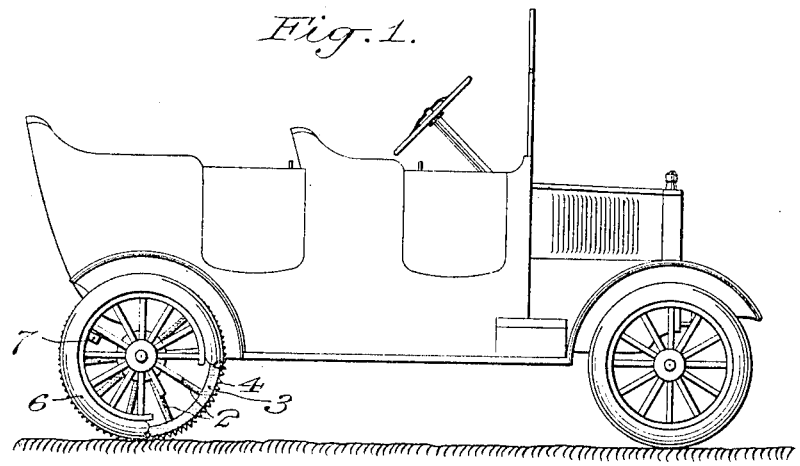
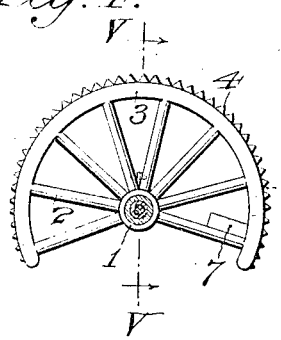
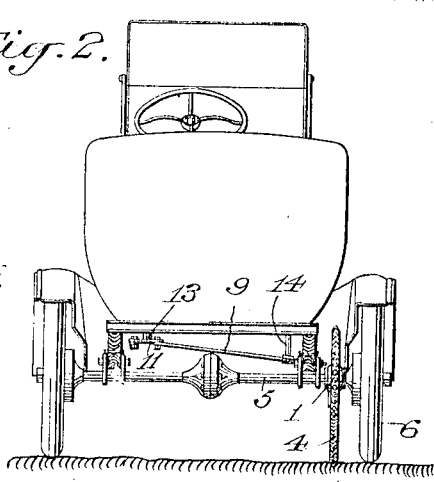
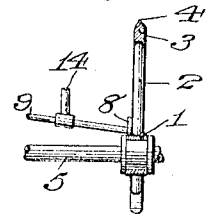
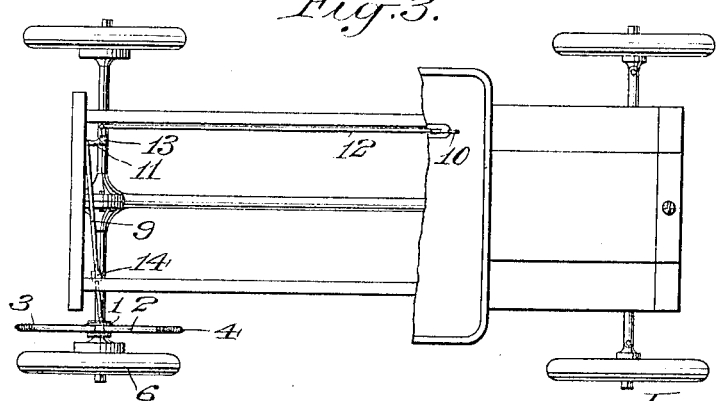

UNITED STATES PATENT OFFICE.

AUGUST GERSTNER, OF BROOKLYN, NEW YORK.

NON-SKID DEVICE FOR AUTOMOBILES.

1,256,221.   Specification of Letters Patent.   Patented Feb. 12, 1918.

Application filed July 20, 1917.   Serial No. 181,785.

*To all whom it may concern:*

Be it known that I, AUGUST GERSTNER, a citizen of the United States, and resident of the borough of Brooklyn, in the city and State of New York, have invented a new and useful Improvement in Non-Skid Devices for Automobiles, of which the following is a specification.

The object of my invention is to provide a non-skid device of novel form which may be very rapidly applied to automobiles now in use and which will effectively prevent the skidding of the automobile and which will at all times be under the control of the operator, whereby the device may be used for a greater or lesser period of time as required.

My device more specifically includes a gravity controlled rotary element and manually controlled means for holding the element in its raised position, the element, when released, being allowed to swing down into engagement with the ground.

A practical embodiment of my invention is represented in the accompanying drawings, in which, Figure 1 represents in side elevation, an automobile with my non-skid device applied thereto, the device being shown swung down into engagement with the ground.

Fig. 2 is a rear end view of the same.

Fig. 3 is a top plan view with certain of the parts removed to more clearly illustrate the means for controlling the operation of the non-skid device.

Fig. 4 is an enlarged detail section showing the gravity controlled rotary element and its adjacent parts, and Fig. 5 is a detail section taken in the plane of the line V—V of Fig. 4.

The gravity controlled rotary element comprises, in the present instance, a hub 1, spokes 2 and toothed rim 3. The teeth 4 gradually approach the axis of rotation of the element at the ends of the rim 3, to prevent road shocks when swinging into and out of its operative position. This rotary element is shown as mounted upon the rear axle housing 5 of the automobile, adjacent to one of the rear wheels 6. A weight 7 is shown, tending to swing the rotary element down into its engagement with the ground.

The manually operated means for holding the element raised is herein shown as comprising a pin or other abutment 8, carried by the hub 1 of the rotary element, which pin coacts with the end of a latch bar 9, which latch bar is connected to a hand lever 10 through the angle lever 11 and longitudinal rod 12, which angle lever is supported from the frame by a hanger 13. Another hanger 14 serves to support the latch bar 9, adjacent to its point of engagement with the abutment 8 on the rotary element.

In operation, when it is desired to use the non-skid device, the operator manipulates the lever 10 and withdraws the latch bar 9 from engagement with the abutment 8. This will permit the rotary element to swing down into engagement with the ground under the influence of the weight 7. If the operator continues to hold the latch bar out of the path of the abutment, the gravity controlled element will keep on rotating as long as desired. When it is no longer desired to use the non-skid device, the latch bar 9 is released and permitted to slide back into the path of the abutment 8, and when the gravity controlled device swings around into its raised position, it will be held there by the coaction of the latch bar 9 and abutment 8. The beveled feature of the ends of the toothed portion of the gravity controlled element not only eliminates road shocks, but also slows up the rotary action of the element as it swings into its raised position so that there is no great shock imposed upon the latch bar 9 when moved into the path of the abutment 8.

It is evident that various changes may be made in the construction, form and arrangement of the several parts without departing from the spirit and scope of my invention and hence I do not wish to limit myself strictly to the construction herein set forth, but.

What I claim is:

1. A non-skid device for automobiles, including a gravity controlled rotary element arranged, when released, to swing into repeated engagement with the ground, and manually operated means for holding the element raised.

2. A non-skid device for automobiles, including a gravity controlled rotary element located adjacent to one of the rear wheels and arranged, when released, to swing into repeated engagement with the ground, and manually operated means for holding the element raised.

3. A non-skid device for automobiles, including a gravity controlled, toothed, rotary element arranged, when released, to swing into repeated engagement with the ground, and manually operated means for holding the element raised.

4. A non-skid device for automobiles, including a gravity controlled, toothed, rotary element located adjacent to one of the rear wheels and arranged, when released, to swing into repeated engagement with the ground, and manually operated means for holding the element raised.

5. A non-skid device for automobiles, including a gravity controlled element mounted to rotate on the rear axle housing adjacent to one of the rear wheels and arranged, when released, to swing into repeated engagement with the ground, and manually controlled means for holding the element raised.

6. A non-skid device for automobiles, including a gravity controlled element mounted to rotate on the rear axle housing adjacent to one of the rear wheels and arranged, when released, to swing into repeated engagement with the ground, and manually controlled means for holding the element raised comprising a hand lever controlled latch and a coacting abutment on the said element.

7. A non-skid device for automobiles, including a gravity controlled, toothed, rotary element arranged, when released, to swing into engagement with the ground, and manually operated means for holding the element in its raised position, the teeth at the ends of the toothed portion of the element gradually approaching the axis of rotation of the element for eliminating shocks in the operation of the element.

In testimony, that I claim the foregoing as my invention, I have signed my name this 18th day of July, 1917.

AUGUST GERSTNER.

Copies of this patent may be obtained for five cents each, by addressing the "Commissioner of Patents, Washington, D. C."